(12) United States Patent
Francescutti et al.

(10) Patent No.: US 6,600,667 B2
(45) Date of Patent: Jul. 29, 2003

(54) ELECTRONIC TRANSFORMER

(75) Inventors: Ugo Francescutti, Ponzano Veneto (IT); Felix Franck, Munich (DE)

(73) Assignee: Patent-Treuhand-Gesellschaft für Elektrische Glühlampen mbH, Munich (DE)

( * ) Notice: Subject to any disclaimer, the term of this patent is extended or adjusted under 35 U.S.C. 154(b) by 0 days.

(21) Appl. No.: 10/070,044

(22) PCT Filed: Jun. 27, 2001

(86) PCT No.: PCT/DE01/02358

§ 371 (c)(1),
(2), (4) Date: Feb. 27, 2002

(87) PCT Pub. No.: WO02/03536

PCT Pub. Date: Jan. 10, 2002

(65) Prior Publication Data

US 2002/0154521 A1 Oct. 24, 2002

(30) Foreign Application Priority Data

Jul. 6, 2000 (DE) .......................... 100 32 043

(51) Int. Cl.$^7$ ............................. H02M 3/335
(52) U.S. Cl. ............... 363/21.04; 363/21.12; 323/222
(58) Field of Search .............. 363/15, 16, 20, 363/21.01, 21.04, 21.12, 95, 97, 131, 21.1, 21.18; 323/222, 223

(56) References Cited

U.S. PATENT DOCUMENTS

| | | | |
|---|---|---|---|
| 4,837,495 A | * 6/1989 | Zansky | ........................ 323/222 |
| 5,790,389 A | 8/1998 | Hua | |
| 5,856,917 A | * 1/1999 | Aonuma et al. | .......... 363/21.04 |
| 5,959,849 A | * 9/1999 | Batarseh et al. | ............. 323/222 |

FOREIGN PATENT DOCUMENTS

WO    WO 88 00768 A    1/1988

OTHER PUBLICATIONS

Sebastian, J; "Improving Power Factor Correction in Distributed Power Supply Systems Using PWM and ZCS–QR Sepic Topologies", Proceedings of the Annual Power Electronics Specialists Conference, Massachusetts, Jun. 25–27, 1991, New York, IEEE, US, Bd. CONF. 22, 23, Jun. 1991, pp. 780–791, XP000278420 ISBN: 0–7803–0090–4.

Jovanovic MM et al; "Reduction of Voltage Stress in Integrated High–Quality Rectifier–Regulators by Variable–Frequency Control"; Proceedings of the Annual Applied Power Electronics Conference and Exposition (APEC), Orlando, Feb. 13–17, 1994, New York, IEEE, US, Bd. 2 CONF. 9, Feb. 13, 1994, pp. 569–575 XP000467366.

Lee Y–S et al; "Novel Single–Stage Isolated Power–Factor–Corrected Power Supplies with Regenerative Clamping", IEEE Transactions on Industry Applications, IEEE Inc. New York, US, Bd. 34, Nr. 6, Nov. 1998, pp. 1299–1308, XP000870796; ISSN: 0093–9994.

Comandatore G. et al; "Designing a High Power Factor Switching Converter Preregulator with the L4981 Continuous Mode", SGS Thomson Microelectronics Application Note, 1997, XP002183394, Italy, p. 5, p. 9.

* cited by examiner

*Primary Examiner*—Michael Sherry
*Assistant Examiner*—Gary L. Laxton
(74) *Attorney, Agent, or Firm*—Cohen, Pontani, Lieberman & Pavane

(57) ABSTRACT

An electronic converter having an input circuit and an output circuit which, in addition to the converter function, carries out power-factor correction. A control circuit opens and closes an electronic switch as a function of the output voltage from the converter circuit and the voltage which is dropped across a current measurement sensor. The circuit has a logic ground LM and a power ground PM at different electrical potentials.

16 Claims, 6 Drawing Sheets

ELECTRONIC TRANSFORMER

This application is a U.S. National Phase Application under 35 USC 371 of International Application PCT/DE01/02358 (not published in English) filed Jun. 27, 2001.

FIELD OF THE INVENTION

The present invention relates to an electronic converter having an input circuit and an output circuit, which are connected to one another via an inductive coupling, with the output circuit having a first and a second output terminal between which an output voltage can be produced, and with the input circuit having a first and a second input terminal for connection of a voltage source which has at least one DC voltage component, a series circuit which is arranged in series between the first input terminal and a first connection of the inductive coupling and comprises an inductance and a capacitor, with the junction point between the inductance and the capacitor being connected via an electronic switch to the second input terminal, and with the inductance being arranged between the junction point and the first input terminal and the capacitor being arranged between the junction point and the inductive coupling, having a sensor resistor which is arranged between the second input terminal and the second connection of the inductive coupling, and having a control circuit to which at least the output voltage and the voltage which is dropped across the sensor resistor can be supplied as input signals, with the control circuit opening and closing the switch as a function of the input signals supplied to it.

The invention furthermore relates to an electronic converter having an input circuit and an output circuit which are connected to one another via an inductive coupling with the output circuit having a first and a second output terminal, between which an output voltage can be produced, and the input circuit having a first and a second input terminal for connection of a voltage source which has at least one DC voltage component, a series circuit, which is arranged in series between the second input terminal and a first connection of a sensor resistor and comprises an inductance and a capacitor, with the junction point between the inductance and the capacitor being connected via a diode to the second connection of the inductive coupling, the second connection of the sensor resistor being connected to the first connection of the inductive coupling, and the inductance being arranged between the junction point and the second input terminal and the capacitor being arranged between the junction point and the first connection of the sensor resistor, an electronic switch which is arranged between the first input terminal and the first connection of the sensor resistor, a storage capacitor which is arranged between the first input terminal and the second connection of the inductive coupling, a control circuit, to which at least the output voltage and the voltage dropped across the sensor resistor can be supplied as input signals, with the control circuit opening and closing the switch as a function of the input signals supplied to it.

Converters such as these are suitable, inter alia, for operation of low-voltage incandescent lamps and optical semiconductors, for example light-emitting diodes (LED) and the like.

BACKGROUND OF THE INVENTION

Circuits such as these are known and are used in the prior art, for example, as DC/DC converters with power levels up to 100 W. The control circuit is generally in the form of a PWM-IC, which monitors current and voltage, while the electronic switch is formed by a vertical power MOSFET.

FIG. 1 shows three embodiments of such topologies, with FIG. 1a showing a so-called BIFRED (Boost Integrated Flyback Rectifier Energy Storage DC/DC Converter) converter, FIG. 1b showing a so-called BIBRED (Boost Integrated Buck Rectifier Energy Storage DC/DC Converter) converter and FIG. 1c showing a so-called PFC Flyback Converter (PFC=Power Factor Correction).

From the year 2001, the mains current harmonics for all lighting devices will have to comply with IEC 1000-3-2. So-called PFC circuits are used for this purpose in the prior art. Described in simple terms, the PFC is adequate, provided the current drawn from the mains is proportional to the mains voltage. The circuits illustrated in FIGS. 1a to 1c are merely higher-order single-ended converters, and need to have additional PFC circuits connected to them on the input side for this purpose.

First of all, however, the circuits in FIGS. 1a to 1c will be described in more detail. The input side of the BIFRED and BIBRED converters is in this case constructed identically, as follows: an input voltage UE, which has at least a DC voltage component, is applied between two input terminals. The first input terminal is optionally followed by a diode D1 and an inductance L1. A parallel circuit is arranged between a first junction point VP1, which follows the inductance L1, and a second junction point VP2, one branch of which parallel circuit comprises a series circuit formed from an electronic switch S1 and a shunt resistor RS. The second parallel branch comprises a capacitor C1 and an inductance L2. The shunt resistor RS is used to determine a variable which is approximately proportional to the load current, to be precise in the form of a voltage US which is supplied to the control circuit ST which controls the switch S1. Provided the current flowing through RS is greater than a specific value, the switch S1 is opened, in order to prevent damage to the circuit itself and to circuits connected on the secondary side. The BIFRED converter illustrated in FIG. 1a has an inductance L3 on its secondary side, and, together with the inductance L2, this forms a two-winding storage coil. A diode, D2 is arranged in series with the inductance L3. A voltage $U_A$ is produced at the output terminals, with a capacitor C2 being arranged between the output terminals.

The BIBRED converter illustrated in FIG. 1b has an inductance L3 on its secondary side, and, together with the inductance L2, this forms a pure AC transformer. A capacitor C2 is arranged in series with the inductance L3, with the series circuit formed in this way being in parallel with a diode D2. The parallel circuit formed in this way is in turn arranged in series with an inductance L4. A capacitor C3 is arranged between the output terminals, at which the output voltage $U_A$ is produced.

The PFC Flyback Converter illustrated in FIG. 1c likewise comprises an input formed by two input terminals and to which a voltage $U_E$ is applied. One input terminal is followed by a diode D1 and an inductance L1. The junction point between D1 and L1 may be connected via an optional capacitor C1 to ground. The inductance is followed firstly by the series circuit formed by a diode D2 and an inductance L2, and secondly by a capacitor C2. The junction point between D2 and L2 is connected via a capacitor C3 to ground. A diode D4 may optionally also be connected to this junction point, with its second connection being connected to the junction point between the diode D1 and the inductance L1. The junction point between L2 and C2 is connected to ground via a switch Si and a shunt resistor RS. The voltage Us that is dropped across the shunt resistor RS is used as the input signal to a control circuit ST, which in turn controls the switch S1. The secondary side of the PFC Flyback Converter comprises an inductance L3 that, together with the inductance L2, forms a two-winding storage coil, with a diode D3 and a capacitor C4 likewise being connected in this case, see FIG. 1a, and in which case the voltage which is dropped across the capacitor C4 can be tapped off as the output voltage $U_A$. Alternatively (not illustrated), the secondary side can also be designed in a manner corresponding to the secondary side in FIG. 1b. The respective ground is annotated M is FIGS. 1a to 1c.

FIG. 2 shows the basic structure, which is known from the prior art, of a PFC: this comprises a capacitor C, an inductance L and a switch S.

SUMMARY OF THE INVENTION

The object of the present invention is to provide electronic converters which do not require any additional control or any additional switches in comparison to electronic converters without PFC, in order to form an electronic converter with PFC.

This and other objects are attained in accordance with one aspect of the present invention directed to an electronic converter that includes an input circuit and an output circuit which share an inductive coupling. The inductive coupling is formed by a first inductance (L2) in the input circuit and a second inductance (L3) in the output circuit. The output circuit has first and second output terminals, between which an output voltage ($U_A$) can be produced. The input circuit includes first and second input terminals for connection of a voltage source ($U_E$) which has at least one DC voltage component. The input circuit further includes a series circuit which is arranged in series between the first input terminal and a first connection end of the first inductance. The series circuit has a third inductance (L1) and a first capacitor (C1). The first junction point (VP1) between them is connected via an electronic switch (S1) to the second input terminal. The third inductance (L1) is arranged between the first junction point (VP1) and the first input terminal. The first capacitor (C1) is arranged between the first junction point (VP1) and the first connection end of the first inductance. A sensor resistor (RS) is disposed between the second input terminal and a second connection end of the first inductance. The series circuit also has a control circuit (ST), to which at least one of the output voltage and a voltage drop ($U_S$) across the sensor resistor (RS) is supplied as an input signal. The control circuit (ST) opens and closes the switch (S1) as a function of the input signal. A second junction point (VP2) between the sensor resistor (RS) and the second connection end is connected to a logic ground (LM). The second input terminal is connected to a power ground (PM), with the power ground and logic ground being at different electrical potentials.

Another aspect of the present invention is directed to an electronic converter that includes an input circuit and an output circuit which share an inductive coupling. The inductive coupling is formed by a first inductance (L2) in the input circuit and a second inductance (L3) in the output circuit. The output circuit has first and second output terminals, between which an output voltage ($U_A$) can be produced. The input circuit includes first and second input terminals for connection of a voltage source ($U_E$) which has at least one DC voltage component. A series circuit arranged in series between the second input terminal and a first connection end of a sensor resistor (RS) has a third inductance (L1) and a capacitor (C2). A junction point between the third inductance (L1) and the first capacitor (C2) is connected via a first diode (D2) to a second connection end of the first inductance (L2). A second connection end of the sensor resistor (RS) is connected to a first connection end of the first inductance (L2). The third inductance (L1) is arranged between the junction point and the second input terminal. The first capacitor (C2) is arranged between that junction point and the first connection end of the sensor resistor (RS). An electronic switch (S1) is arranged between the first input terminal and the first connection end of the sensor resistor (RS). A second capacitor (C3) is arranged between the first input terminal and the second connection end of the first inductance L2. The input circuit further includes a control circuit (ST), to which at least one of the output voltage and a voltage drop ($U_S$) across the sensor resistor (RS) is supplied as an input signal. The control circuit (ST) opens and closes the switch (S1) as a function of the input signal. A junction point between the sensor resistor (RS) and a first connection end of the first inductance (L2) is connected to a logic ground (LM). The first input terminal is connected to a power ground (PM), with the power ground and logic ground being at different electrical potentials.

The invention is based on the idea of isolating the reference potentials of the control circuit on the one hand and the PFC on the other hand from one another.

The respective topology is converted in such a manner that the current measurement sensor (Shunt, RS) is connected to the load exclusively in series with the primary side. In this case, it may be necessary for the PFC to be oriented to the positive and/or for the control circuit to be at a high-frequency potential. In this way—in contrast to the prior art—the current measurement is not interfered with in any way by signals from the PFC or from any other low-loss snubbers (generally tuned circuits).

Finally, the reference potential of the control circuit is preferably designed such that, when the switch is switched on, and with the switch being, in particular, a power transistor, a positive measurement signal is applied to the current measurement input of the control circuit. The sequence of the primary side of the load, the reference potential of the control circuit and the current measurement sensor may in this case be as required. The reference potential of the control circuit may thus also be located between the current measurement sensor and the primary side of the load.

In one particularly advantageous variant of the invention, the current measurement sensor is bridged by a diode, in particular a Schottky diode, in such a manner that no negative signals can be applied to the current measurement input of the control circuit.

Further advantageous developments of the invention are defined in the dependent claims.

BRIEF DESCRIPTION OF THE DRAWINGS

Exemplary embodiments of the invention will be described in more detail in the following text with reference to the attached drawings, in which:

FIG. 4 shows the time profile of the currents $I_{L1}$, $I_{S1}$ and $I_{D2}$ for the circuit arrangement shown in FIG. 3a.

DETAILED DESCRIPTION OF THE DRAWINGS

Figure 1A:
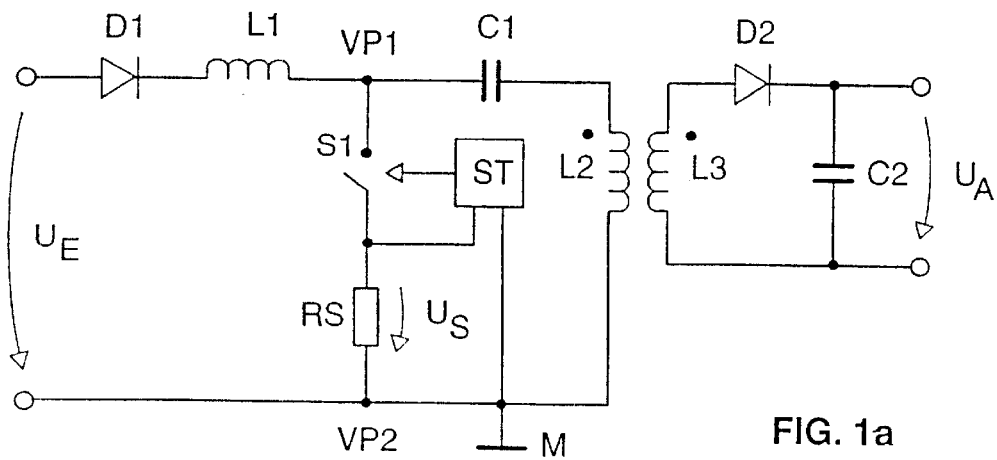
FIG. 1a shows a so-called BIFRED converter as is known from the prior art.
Figure 1B:
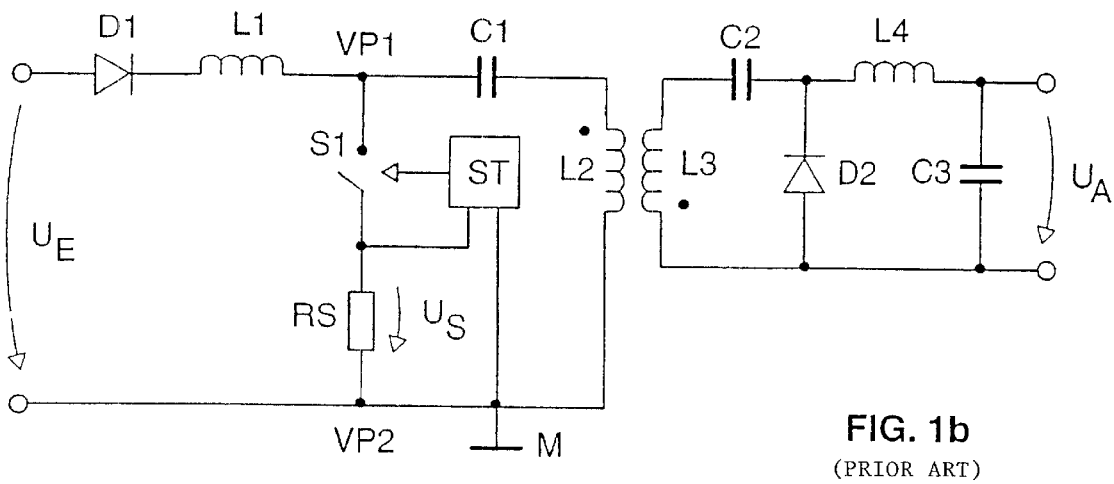
FIG. 1b shows a so-called BIBRED converter as is known from the prior art.
Figure 1C:
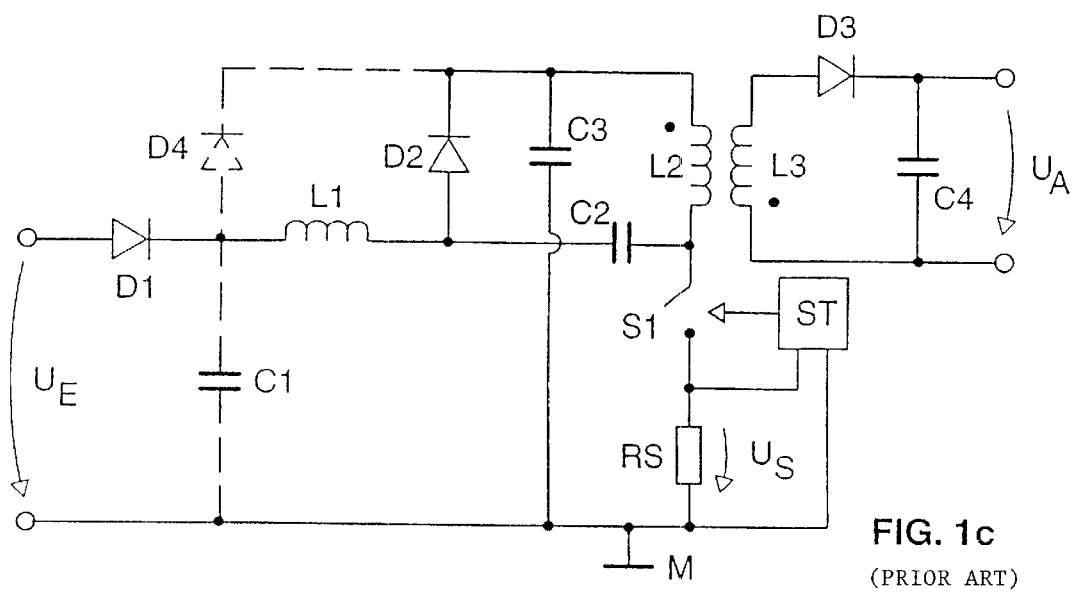
FIG. 1c shows a so-called PFC Flyback converter as is known from the prior art.
Figure 2:
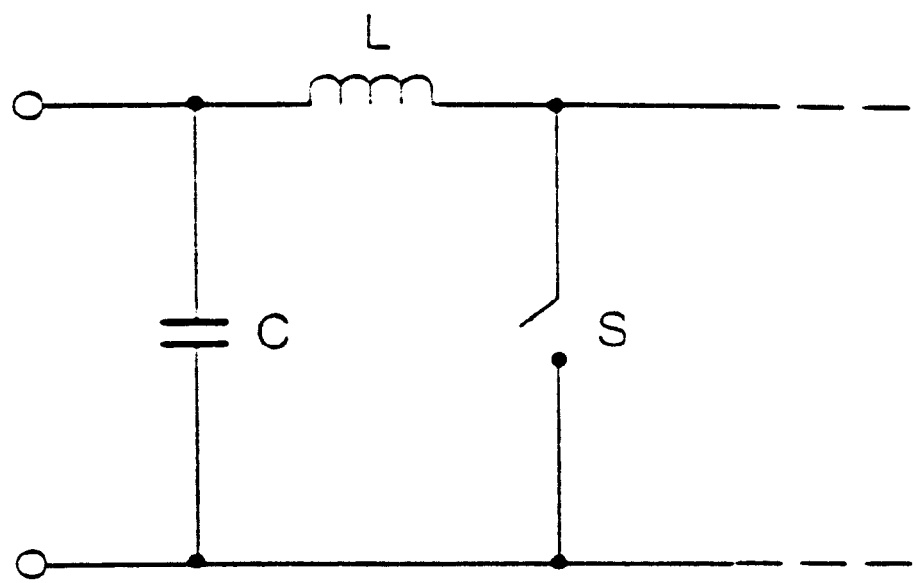
FIG. 2 shows the basic structure, which is known from the prior art, of a PFC circuit.

The electronic converter circuits according to the invention illustrated in FIG. 3 are based on the electronic converter circuits illustrated in FIG. 1, with corresponding components being annotated with corresponding reference symbols, and these will therefore not be explained once again. The idea according to the invention is implemented in the electronic converters shown in FIG. 3 by each circuit having a separate logic ground LM and a separate power ground PM.

Figure 3A:
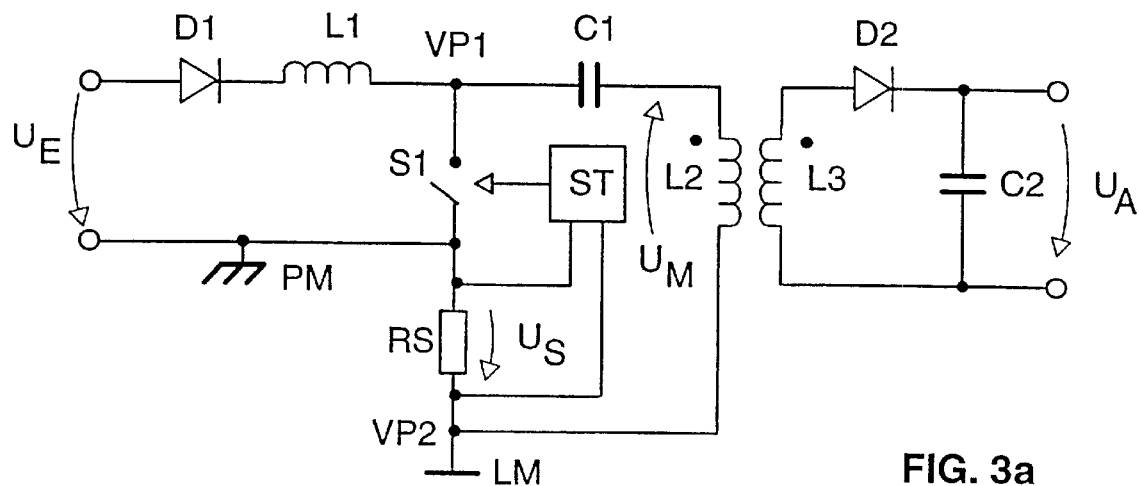
FIG. 3a shows an electronic converter according to the invention, which is based on the known BIFRED circuit.
Figure 3B:
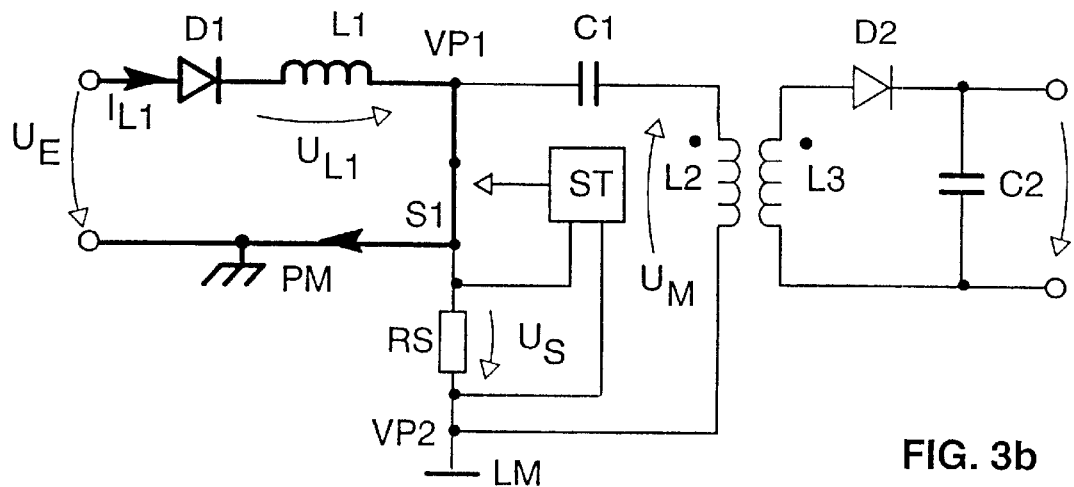
FIGS. 3b–e show illustrations of the converter from FIG. 3a, with different current paths being emphasized.
Figure 3C:
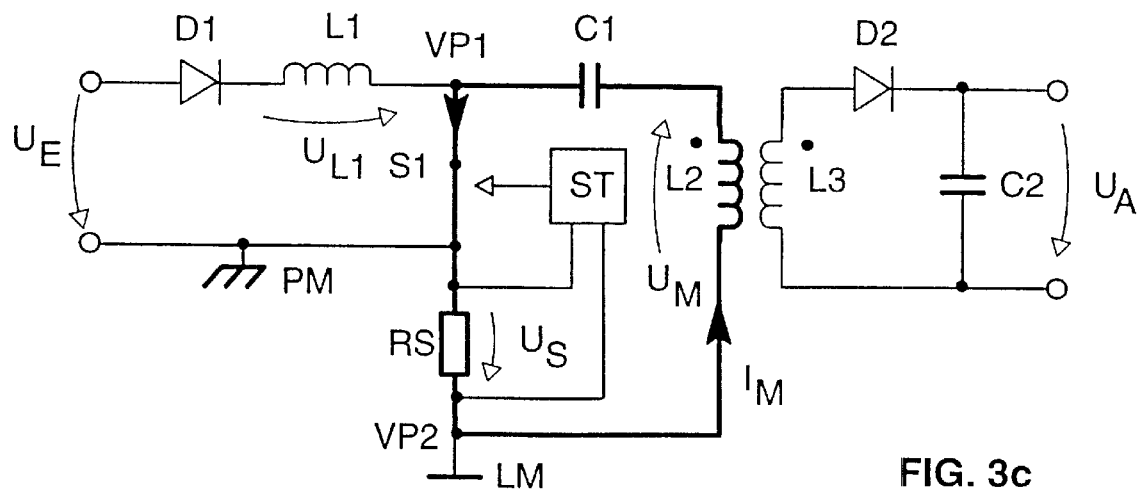
Figure 3D:
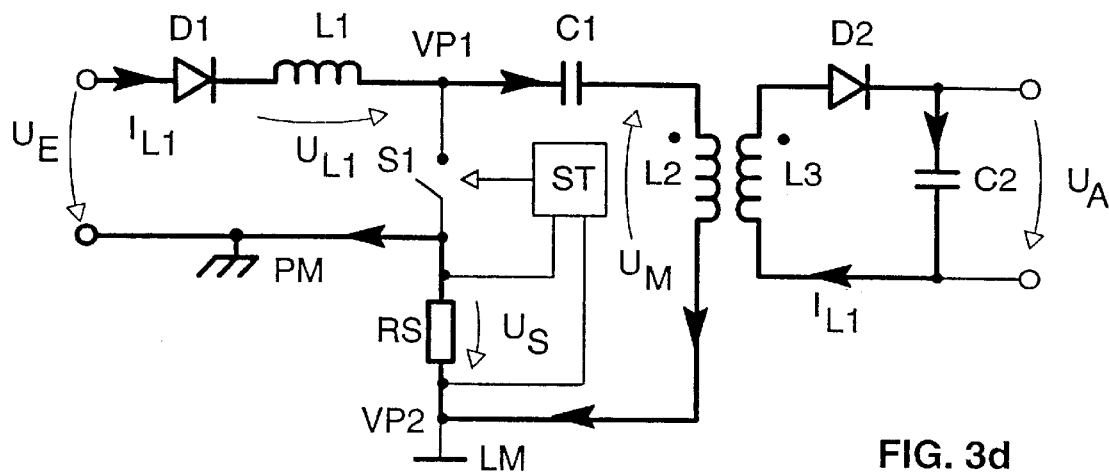
Figure 3E:
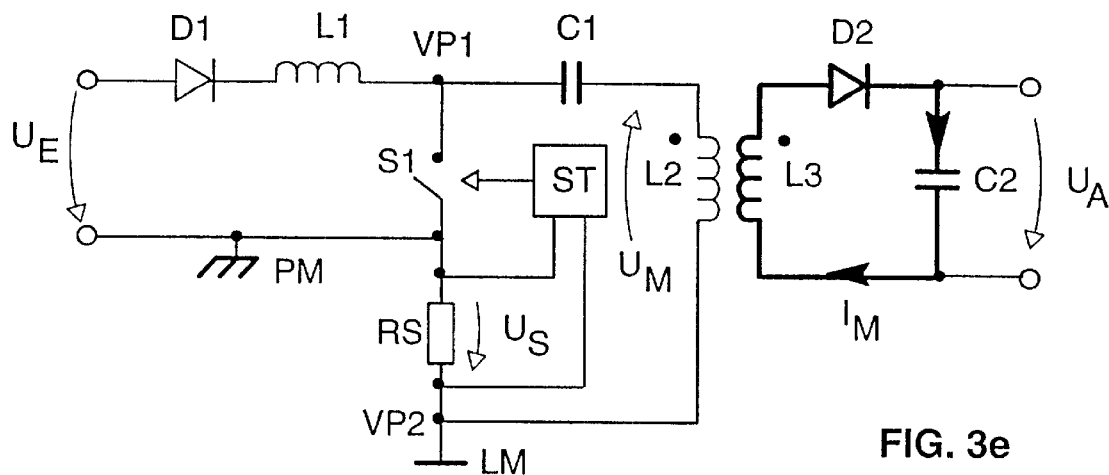
Figure 3F:
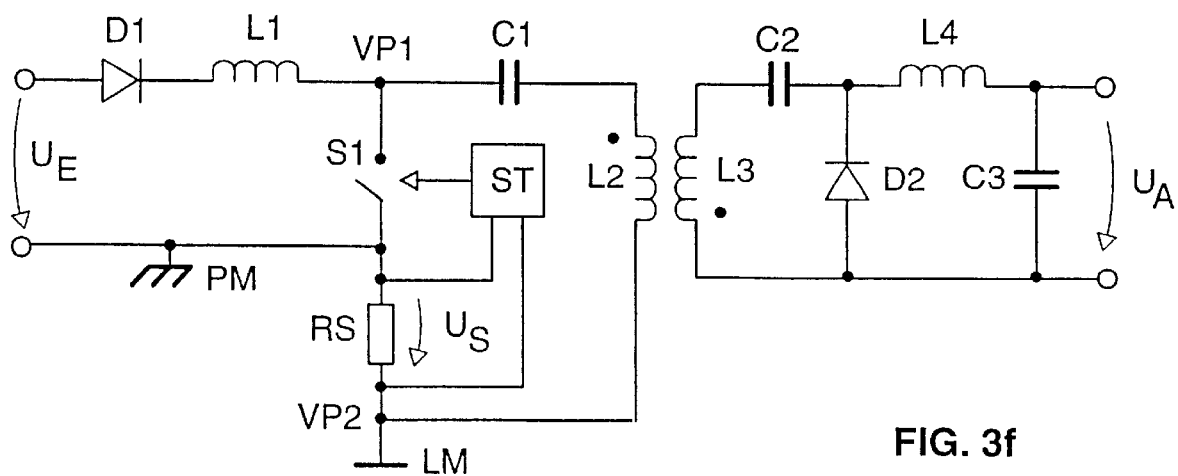
FIG. 3f shows an electronic converter according to the invention, which is based on the BIBRED circuit.
Figure 3G:
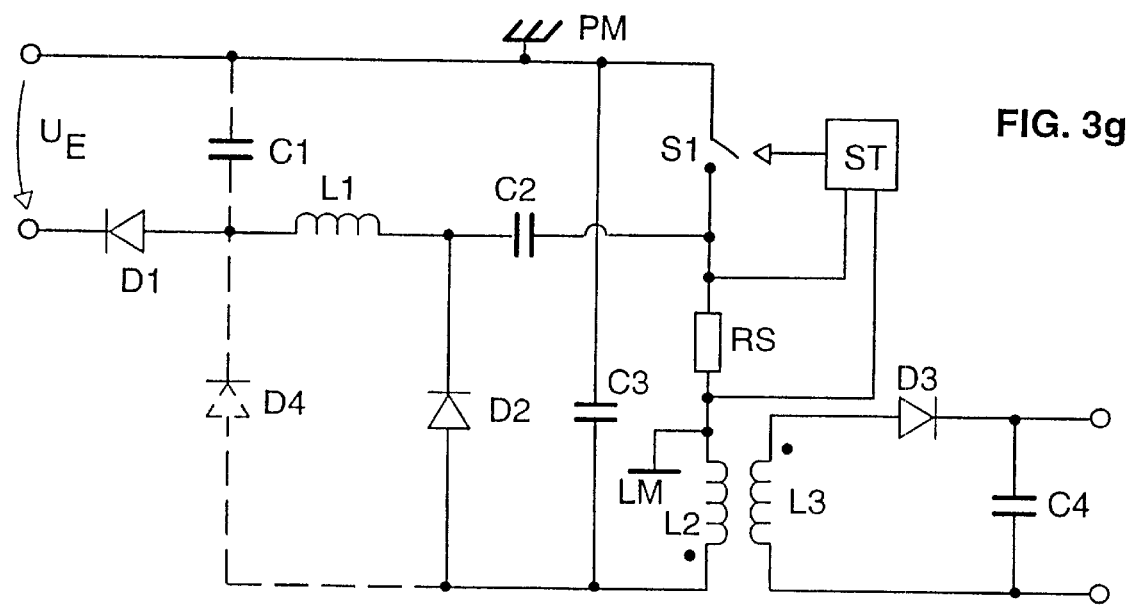
FIG. 3g shows an electronic converter according to the invention, which is based on the PFC Flyback circuit.

In the circuit variants shown in FIGS. 3a and 3f, the junction point between the sensor resistor RS, which performs as a current measurement sensor, and the second connection end of the inductance L2 is connected to a logic ground LM, while the second input terminal is connected to a power ground PM. In the electronic converter shown in FIG. 3g, the invention is implemented as follows. The junction point between the sensor resistor RS and the first connection end of the inductance L2, is connected to a logic ground LM, while the first input terminal is connected to a power ground PM.

Figure 4:
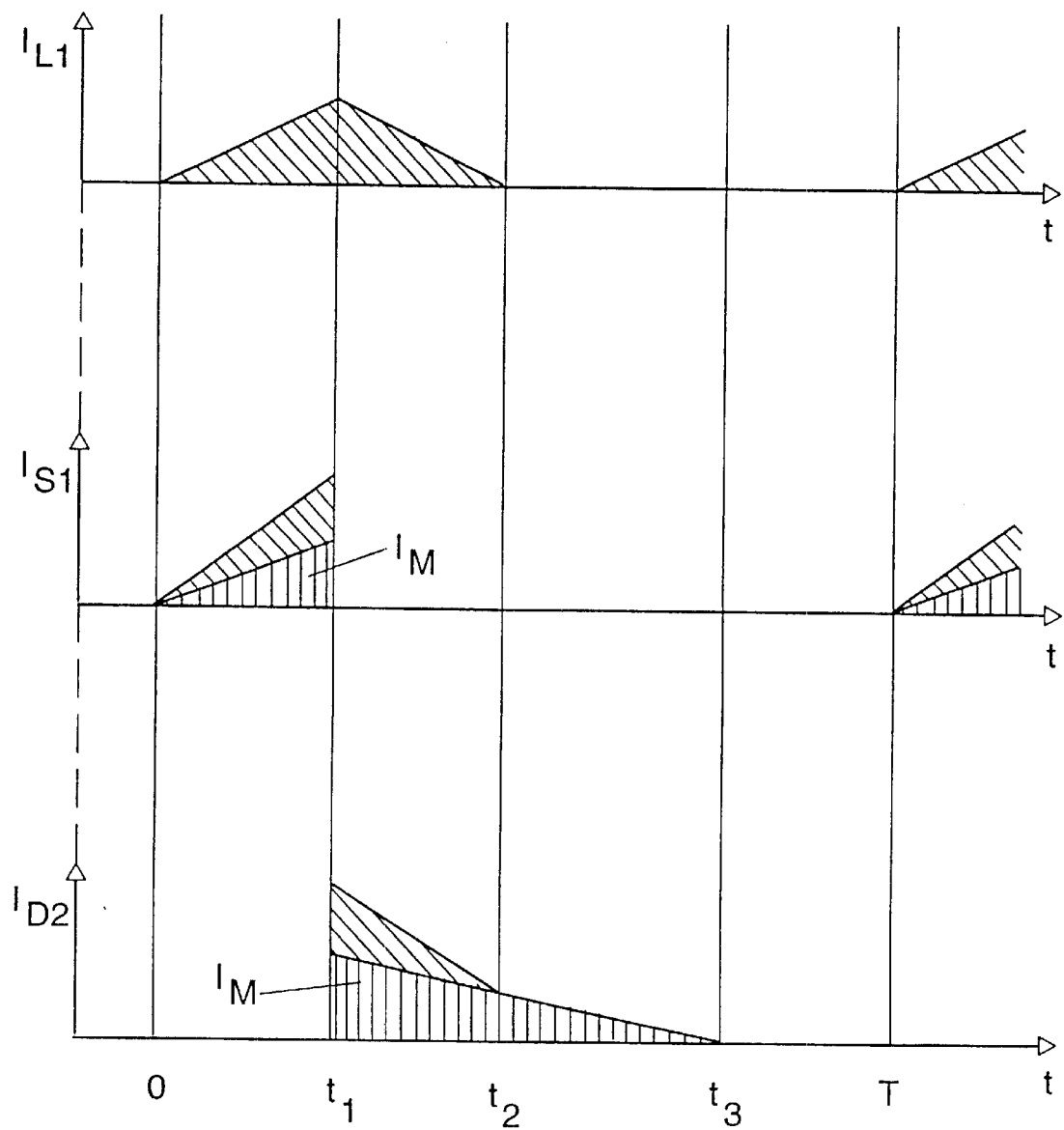

Surprisingly, this circuit measure means that the respective converter not only carries out its conversion task but also PFC. This will be described in the following text using the example of the circuit arrangement shown in FIG. 3a in conjunction with FIGS. 3b to 3e and FIG. 4:

For this purpose, the current paths of the currents $I_{L1}$ and $I_M$ are emphasized in FIGS. 3b to 3e. In FIG. 4, the time profile of the current $I_{L1}$, through the inductance L1, $I_{S1}$ through the switch S1, $I_{D2}$ through the diode D2 and $I_M$ are plotted against time. One cycle extends over the times 0 to T. In this case, the time profile of the current $I_{L1}$ in FIG. 4 corresponds to the emphasized current paths in FIGS. 3b and 3d (primary circuit only), the time profile of the current $I_{S1}$ corresponds to the emphasized current paths in FIGS. 3b and 3c, and the time profile of the current $I_{D2}$ corresponds to the emphasized current paths in FIGS. 3d (secondary circuit only) and 3e.

The times 0 to t are defined as follows:

Time 0: switch S1 on

Time period between 0 and $t_1$: S1 and D1 on $U_{L1}=|U_E|$; $U_M=U_{C1}$; the currents $I_{L1}$ and $I_M$ are added in S1.

Time $t_1$: switch S1 off

Time period between $t_1$ and $t_2$: D1 and D2 on $U_{L1}=|U_E|-U_{C1}-U_A$; $U_M=-U_A$; the currents $I_{L1}$ transmitted by transformer action and the stored current $I_M$ are added in D2.

Time $t_2$: D1 switches off Time period between $t_2$ and $t_3$: D2 on $U_{L1}=0$; $U_M=-U_A$ Time $t_3$; D2 switches off Time period between $t_3$ and T: quiescent phase; no current flows; indication of intermittent operation.

To simplify the verification process, the following assumptions are made: $U_A$=const; $U_{C1}$=const. Furthermore: $U_A<U_{C1}$. The turns ratio of the inductance coupling is 1:1.

The relationships within one half-cycle of the mains voltage and during intermittent operation are in each case as follows:

$$t \le t_1 : I_{L1} = \frac{|U_E|}{L1}t;\ \hat{I}_{L1} = \frac{|U_E|}{L1}t_1;$$

$$t > t_1 : I_{L1} = \frac{|U_E|}{L1}t_1 + \frac{|U_E| - U_{C1} - U_A}{L1}(t - t_1);$$

Since, at the time $t_2$: $I_{L1}=0$, it follows that:

$$t_2 = \frac{(U_{c1} + U_A)}{(U_{c1} + U_A - |U_E|)}t_1;$$

and, correspondingly:

$$t_2 - t_1 = \left(\frac{|U_E|}{U_{C1} + U_A - |U_E|}\right)t_1;$$

$$|I_E| = \frac{1}{T}\int_0^T IL1\,dt =$$

$$\frac{\hat{I}_{L1}}{2T}(t_1 + t_2 - t_1) = \frac{|U_E|}{2L1T}t_1 t_2 = \frac{|U_E|}{2L1T}t_1^2\left(\frac{U_{C1} + U_A}{U_{C1} + U_A - |U_E|}\right)$$

To a first approximation, it follows from this that:

$$|I_E|\sim|U_E| \text{ and } |I_E|\sim t_1^2$$

$|I_E|\sim|U_E|$ itself indicates here that the circuit is providing PFC in addition to its actual converter function.

If it can be shown that the output current $I_A$ is proportional to the input current $I_E$, then this confirms that the circuit is also carrying out its converter function, despite the PFC function.

On the other hand, for $t \le t_1$:

$$I_M = \frac{U_E}{L2}t;\ \hat{I}_M = \frac{U_E}{L2}t_1;$$

For $t>t_1$:

$$I_M = \frac{U_E}{L2}t_1 - \frac{U_A}{L2}(t - t_1);$$

Since $I_M$ is equal to 0 at the time $t_3$, this means that:

$$t_3 = \frac{U_{C1} + U_A}{U_A}t_1;$$

and, in a corresponding manner $$t_3 - t_1 = \frac{U_{C1}}{U_A}t_1.$$

On the other hand:

$$I_A = \frac{1}{T}\int_0^T I_{D2}\,dt = \frac{1}{T}\int_{t1}^{t2} I_{L1}\,dt +$$
$$\frac{1}{T}\int_{t1}^{t3} I_M\,dt = \frac{\hat{I}_{L1}}{2T}(t_2-t_1) + \frac{\hat{I}_M}{2T}(t_3-t_1) =$$
$$= \frac{|U_E|t_1^2}{2L_1 T}\left(\frac{|U_E|}{U_{C1}+U_A-|U_E|}\right) + \frac{U_{C1}^2}{2L_2 T}\cdot\frac{U_{C1}}{U_A}$$

it can be seen from this that $I_A \sim t_1^2$ and $I_A \sim |U_E|$:

The energy balance within the converter is thus correct, and high efficiencies are possible.

In a further embodiment of the invention, which is not illustrated, the inductive coupling can also be provided by a single coil, at whose first connection the first connection of the primary is connected to the first connection of the secondary of the inductive coupling, and at whose second connection the second connection of the primary is connected to the second connection of the secondary of the inductive coupling.

What is claimed is:

1. An electronic converter comprising an input circuit and an output circuit which share an inductive coupling formed by a first inductance (L2) in the input circuit and a second inductance (L3) in the output circuit, the output circuit having a first and a second output terminal, between which an output voltage (U$_A$) can be produced, wherein the input circuit comprises:

a first and a second input terminal for connection of a voltage source (U$_E$) which has at least one DC voltage component;

a series circuit between the first input terminal and a first connection end of the first inductance and which comprises a third inductance (L1) and a first capacitor (C1), with a first junction point (VP1) between the third inductance and the first capacitor being connected via an electronic switch (S1) to the second input terminal, and the third inductance (L1) being arranged between the first junction point (VP1) and the first input terminal, and the first capacitor (C1) being arranged between the first junction point (VP1) and said first connection end;

a sensor resistor (RS) between the second input terminal and a second connection end of the first inductance; and a control circuit (ST), to which at least one of the output voltage and a voltage drop (U$_S$) across the sensor resistor (RS) is supplied as an input signal, the control circuit (ST) opening and closing the switch (S1) as a function of said input signal;

wherein a second junction point (VP2) between the sensor resistor (RS) and said second connection end is connected to a logic ground (LM), and the second input terminal is connected to a power ground (PM), with the power ground and logic ground being at different electrical potentials.

2. The electronic converter of claim 1, wherein a Schottky diode is arranged in parallel with the sensor resistor (RS).

3. The electronic converter of claim 1, wherein a first diode (D1) is arranged between the first input terminal and the third inductance (L1).

4. The electronic converter of claim 1, wherein the inductive coupling (L2, L3) comprises a storage coil.

5. The electronic converter of claim 1, wherein the inductive coupling (L2, L3) has an AC transformer with a primary side formed by said first inductance (L2), and a secondary side formed by said second inductance (L3), with the primary side (L2) being part of the input circuit, and the secondary side (L3) being part of the output circuit.

6. The electronic converter of claim 5, wherein a parallel circuit is formed by a series circuit comprising the secondary side of the AC transformer (L3) and a second capacitor (C2) arranged in parallel with a second output diode (D2).

7. The electronic converter of claim 1, wherein the output terminals are arranged in parallel with a second capacitor (C2).

8. The electronic converter of claim 6, wherein the parallel circuit is arranged in series with a fourth inductance (L4), to form a series arrangement which is in parallel with the output terminals and with a third capacitor (C3) which is arranged between said output terminals.

9. An electronic converter comprising an input circuit and an output circuit which share an inductive coupling formed by a first inductance (L2) in the input circuit and a second inductance (L3) in the output circuit, the output circuit having a first and a second output terminal, between which an output voltage (U$_A$) can be produced, wherein the input circuit comprises:

a first and a second input terminal for connection of a voltage source (U$_E$) which has at least one DC voltage component;

a series circuit between the second input terminal and a first connection end of a sensor resistor (RS) and comprises a third inductance (L1) and a capacitor (C2), with a junction point between the third inductance (L1) and the first capacitor (C2) being connected via a first diode (D2) to a second connection end of the first inductance (L2), a second connection end of said sensor resistor (RS) being connected to a first connection end of said first inductance (L2), the third inductance (L1) being arranged between the junction point and the second input terminal, and the first capacitor (C2) being arranged between the junction point and said first connection end of the sensor resistor (RS);

an electronic switch (S1) between the first input terminal and said first connection end of the sensor resistor (RS);

a second capacitor (C3) between the first input terminal and said second connection end of the first inductance (L2); and a control circuit (ST), to which at least one of the output voltage and a voltage drop (U$_S$) across the sensor resistor (RS) is supplied as an input signal, with the control circuit (ST) opening and closing the switch (S1) as a function of said input signal;

wherein a junction point between the sensor resistor (RS) and a first connection end of the first inductance (L2) is connected to a logic ground (LM), and the first input terminal is connected to a power ground (PM), with the power ground and logic ground being at different electrical potentials.

10. The electronic converter of claim 9, wherein a first input diode (D1) is arranged between the third inductance (L1) and the second input terminal.

11. The electronic converter of claim 10, wherein a junction point between the first input diode (D1) and the third inductance (L1) is connected via a third capacitor (C1) to the first input terminal.

12. The electronic converter of claim 10, wherein a junction point between the first input diode (D1) and the third inductance (L1) is connected via a second input diode (D4) to the second connection end of said first inductance (L2).

13. The electronic converter of claim 9, wherein the inductive coupling (L2, L3) comprises a storage coil.

14. The electronic converter of claim 9, wherein the inductive coupling (L2, L3) has an AC transformer with a primary side formed by said first inductance (L2), and a secondary side formed by said second inductance (L3), with the primary side (L2) being part of the input circuit, and the secondary side (L3) being part of the output circuit.

15. The electronic converter of claim 13, wherein a parallel circuit comprising a third capacitor (C4) and a series circuit formed by the storage coil (L3) and an output diode (D3) is arranged between the output terminals.

16. The electronic converter of claim 9, wherein a Schottky diode is arranged in parallel with the sensor resistor (RS).

* * * * *